Figure 1:
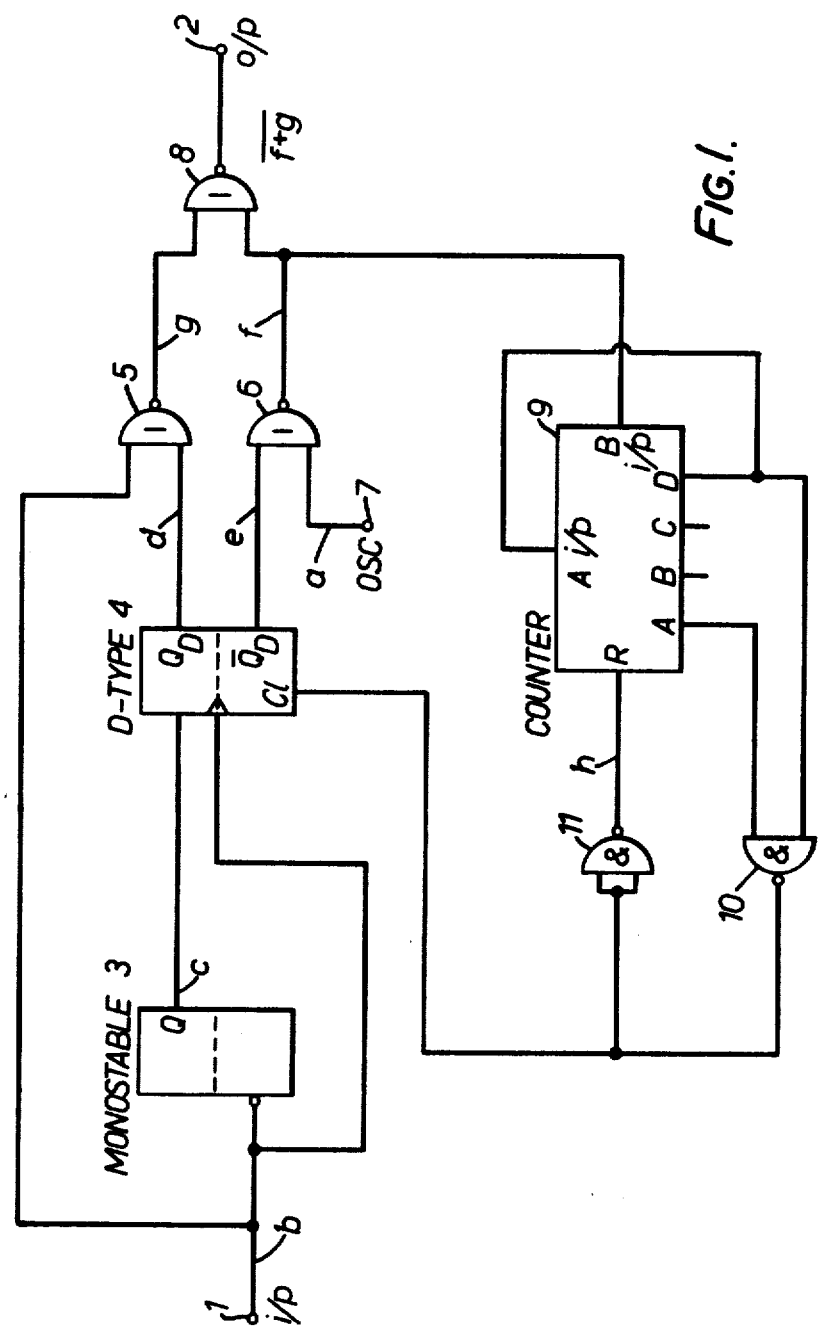

United States Patent [19]

Smith

[11] 4,211,982

[45] Jul. 8, 1980

[54] CONTROL CIRCUITS

[75] Inventor: Robin Smith, Chelmsford, England

[73] Assignee: The Marconi Company Limited, Chelmsford, England

[21] Appl. No.: 885,007

[22] Filed: Mar. 9, 1978

[30] Foreign Application Priority Data

Mar. 9, 1977 [GB] United Kingdom ................ 9828/77

[51] Int. Cl.$^2$ ...................... H03K 1/16; H03K 5/20; H03K 9/06

[52] U.S. Cl. .................................. 328/138; 328/140; 315/377

[58] Field of Search ...................... 328/138, 140, 141; 315/377

[56] References Cited

U.S. PATENT DOCUMENTS

| | | | |
|---|---|---|---|
| 3,614,619 | 10/1971 | Huntsinger et al. | 328/138 |
| 3,958,183 | 5/1976 | Schaefer | 328/138 |
| 3,976,948 | 8/1976 | Dearden et al. | 328/138 |
| 4,002,987 | 1/1977 | Kuhn | 328/138 |
| 4,052,676 | 10/1977 | Crittenden | 328/141 X |

Primary Examiner—John S. Heyman
Attorney, Agent, or Firm—Diller, Ramik & Wight

[57] ABSTRACT

A control circuit enables range and bearing markers on a p.p.i. radar display to be moved quickly and accurately. The control circuit has an input terminal receiving control pulses whose frequency of occurrence is manually selected, an output terminal for providing marker position-changing pulses and a series connection of a monostable device and a binary device, together with gating devices, so that the received control pulses are passed to the output terminal when the frequency of occurrence is below a certain value and so that a burst of position-changing pulses are provided, for each received control pulse, when the frequency of occurrence is above said certain value.

8 Claims, 2 Drawing Figures

CONTROL CIRCUITS

This invention relates to control circuits and is suitable for and primarily intended for use with certain kinds of plan position indicator (p.p.i.) displays used with radar systems. Some p.p.i. displays carry markers in addition to target echo information so that the range and bearing of selected targets can be more easily and quickly appreciated. Accordingly, in such cases two movable markers are provided, one usually a straight radial line passing through the origin of the p.p.i. display to indicate bearing, and the other a circular line of adjustable diameter centred on the origin to indicate range. Control of the position of the markers must be accurate, and at the same time a requirement arises to move the markers very quickly. The present invention seeks to provide a control circuit in which both these requirements can be economically satisfied.

According to this invention, a control circuit suitable for controlling the position of movable markers on a p.p.i. radar display includes means for receiving control pulses and for passing them to an output terminal when the rate at which control pulses are received is below a predetermined value, and means for generating a plurality of output pulses for each received pulse when said rate is above the predetermined value.

Preferably, the predetermined rate is determined by the time constant of a monostable device to which the received control pulses are fed.

Preferably again, a constant plurality of output pulses are generated for all values of said rate above the predetermined value.

The additional plurality of pulses can conveniently be derived from a constant frequency oscillator which is gated into circuit for a fixed period in response to each pulse received at above said rate.

Preferably, the fixed period is determined by a counter arranged to count the pulses fed into circuit by the constant frequency oscillator, and which inhibits the oscillator when its count reaches a predetermined value.

Figure 2:
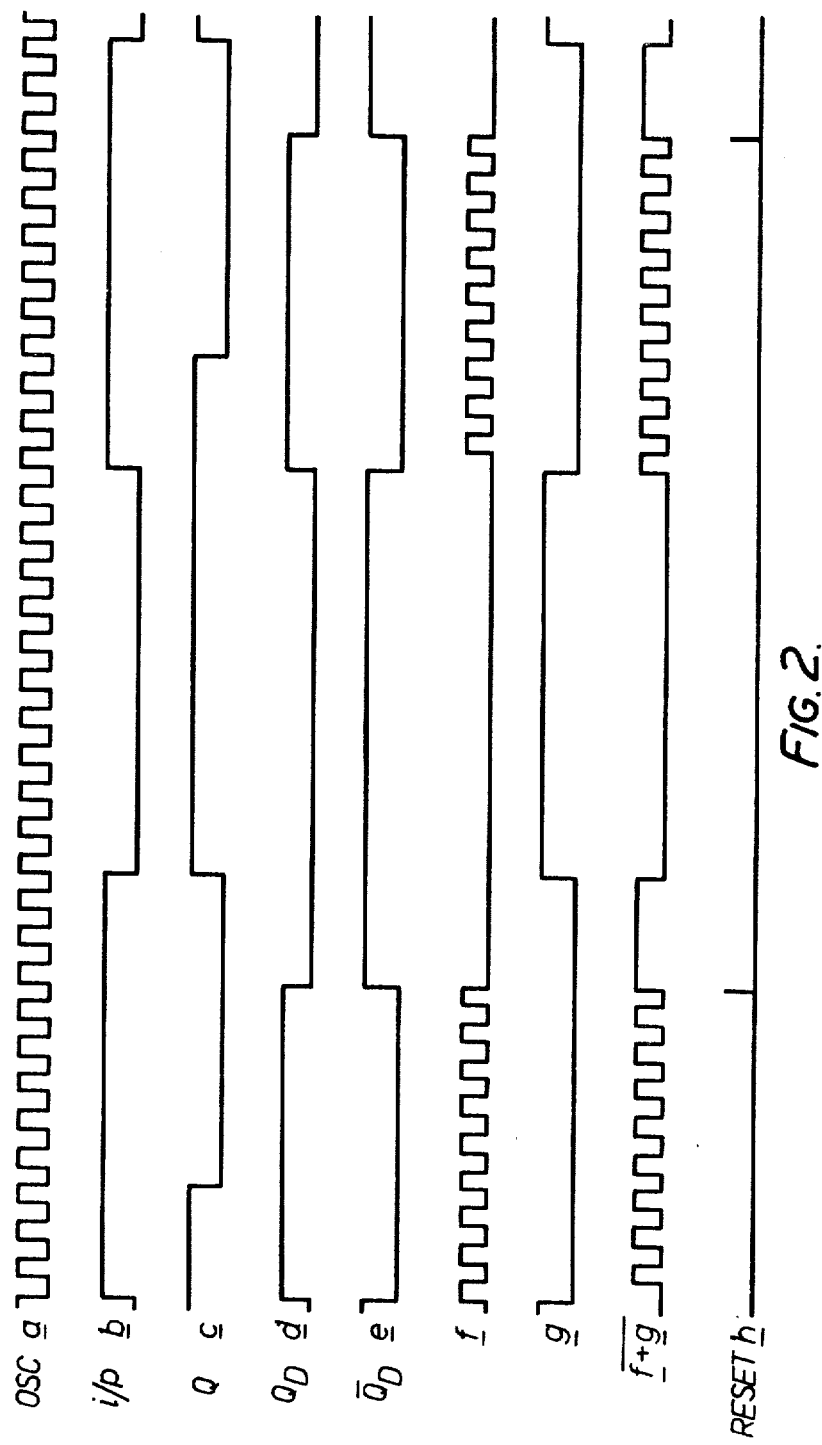

The invention is further described by way of example, with reference to the accompanying drawings in which FIG. 1 shows one form of a control circuit in accordance with this invention, and FIG. 2 shows an explanatory waveform diagram.

Referring to FIG. 1, there is shown therein a control circuit which receives control pulses at an input terminal 1, and which provides, in response thereto control pulses at an output terminal 2. If the input pulses are received at a rate below a threshold value, the same number of pulses are presented at the output terminal 2, but if the input pulses exceed a given rate additional control pulses are generated within the control circuit so that more output pulses are presented at terminal 2.

When the control circuit is used in conjunction with a p.p.i. radar display having movable markers, the markers are moved by means of control pulses generated commonly in response to movement of a manually operable control, such as a rotatable knob or wheel. If it is desired to move a marker by a large amount, the manual action required can become tedious, and the control circuit shown in FIG. 1 largely reduces this difficulty, since rapid movement of the manually operable control is arranged to generate control pulses at a rate above a threshold value, so that many additional control pulses are thereby generated, giving even more rapid movement of the marker.

Input terminal 1 is connected to the trigger terminal of a monostable device 3 having a pulse length of about 60ms, and also to the clock terminal of a D-type bistable 4, and to one input of a dual input NOR gate 5. The Q output terminal of the monostable 3 is connected to the 'D' input of the D-type bistable 4, and the $Q_D$ output of this device is connected to the remaining input of the dual input NOR gate 5. The $Q_D$ output of the bistable 4 is connected to one input of another dual input NOR gate 6, the other input of which is connected to an external oscillator (not shown) via terminal 7.

The outputs of the NOR gates 5 and 6 go to respective inputs of a dual input NOR gate 8, the output of which is connected to the output terminal 2. The output of NOR gate 6 is also connected to the B input of a counter 9. The counter 9 is a decade counter having four output terminals A. B. C. D; the different combinations of signals present at these outputs being representative of counts 0 to 9. In this case, only the count 9 is required, and this is given by outputs A and D in combination. The D output of the counter is fed back to its A input, and the outputs from the A and D output terminals are combined at a dual input NAND gate 10. Te output of NAND gate 10 is connected to the clear terminal of the binary device 4, and also via a logic inverter 11 to the reset terminal of the decade counter 9.

When the pulses are applied to the input terminal 1 at below a certain rate, which rate is determined by the time constant of the monostable device 3, the output waveform at terminal 2 is the same as the input waveform. Above this frequency, however, extra pulses are added, and these additional pulses are derived from the external oscillator at terminal 7. The additional pulses are gated through to the output terminal 2 until the number of these additional pulses reaches a preset number indicated by the decade counter 9. In this case, when the number 9 is reached, logic 'high' signals are provided at both the A and D outputs, and this combination is detected by gate 10, and is arranged to reset the monostable device 3 and the counter 9. By selecting different combinations of the four outputs A, B, C, D of counter 9, different reset periods are obtainable. When the preset number is reached, the D-type bistable is reset and this prevents further pulses from the external oscillator being gated to the output terminal 2 until the next input pulse is received.

The waveforms, present at different points in the circuit, are shown in FIG. 2 for the case in which the rate at which input pulses are received is above the threshold value of the monostable device.

As will be evident from the waveforms of FIG. 2, the monostable 3 is triggered at the negative edge of the input waveform b whereas the D-type bistable 4 is clocked at the positive edge of each input pulse. In the case illustrated, the frequency of the input waveform b is sufficiently high that the next positive edge of the input waveform occurs while the output waveform c of the monostable is still High. As a result, the bistable Q output (waveform d) is clocked High and its $\overline{Q}$ output (waveform e) is clocked Low. Once the waveform e is Low, the output of the NOR gate 6 will be the inverse of the oscillator waveform a. Since the waveform d is High during this time, the output of the NOR gate 5 will remain Low regardless of the state of the input waveform b. In consequence, the output $\overline{f+g}$ of the NOR gate 8 will be in consonance with the oscillator output, waveform a. When the counter 9 produces the "reset" signal, waveform h, the output of the bistable 4 is set to its normal output, Q Low and $\overline{Q}$ High, which thus inhibits the NOR gate 6 and enables the NOR gate 5. Thus, when the input waveform a subsequently goes Low, the output of the gate 5 goes High, waveform g, thus inhibiting the gate 8 and terminating the last pulse of the output $\overline{f+g}$.

The waveform condition in which the frequency of the input waveform b is below the threshold is not shown inasmuch as the waveforms d, e, f and h do not change under this condition. Specifically, the waveform d remains low, waveform e remains High, waveform f remains Low and no "reset" pulses appear in waveform h. The waveform c of course remains the same as shown in FIG. 2 but, since the frequency of the input waveform b is now below the threshold, the negative edge of the input waveform b will always occur when the output of the monostable 3 is Low. Thus, the Q output of the bistable will always be clocked Low and its $\overline{Q}$ output will remain High, thus inhibiting the gate 6 such that its output, waveform f, remains Low, allowing the inverted input waveform g to control the gate 8 and thus produce the output waveform $\overline{f+g}$ which is a duplication of the input waveform b (i.e., twice inverted). The counter 9 is of course not clocked.

If more than one movable marker is to be controlled, then the corresponding number of control circuits must be provided. For the case in which two movable markers are used in a p.p.i. radar display, one for range and the other for bearing, two control circuits are needed. The output pulses provided by each control circuit move the markers in incremental steps by a precise amount for each pulse, and a count is kept of these pulses (by a counter not shown) so that the exact position of a marker, or the amount by which it has been moved is available to an operator.

It will be appreciated that when it is desired to move a marker slowly or by only a small amount the control circuit does not add any extra control pulses and by correctly setting the rate at which additional pulses are generated a very fine degree of control can be achieved.

I claim:

1. In a radar display, a control circuit suitable for controlling the position of movable markers on a p.p.i. radar display including means for receiving control pulses and for passing them to an output terminal when the rate at which control pulses are received is below a predetermined value, and means for generating a plurality of output pulses for each received pulse when said rate is above the predetermined value.

2. A control circuit as claimed in claim 1 and wherein the predetermined rate is determined by the time constant of a monostable device to which the received control pulses are fed.

3. A control circuit as claimed in claim 1 and wherein a constant plurality of output pulses are generated for all values of said rate above the predetermined value.

4. A control circuit as claimed in claim 1 and wherein the additional plurality of pulses are derived from a constant frequency oscillator which is gated into circuit for a fixed period in response to each pulse received at above said rate.

5. A control circuit as claimed in claim 4 and wherein the fixed period is determined by a counter arranged to count the pulses fed into circuit by the constant frequency oscillator, and which inhibits the gated output of the oscillator when its count reaches a predetermined value.

6. A circuit for controlling the position of movable markers on a p.p.i. radar display, said circuit having input terminal means for receiving control pulses whose frequency of occurrence is manually selected, output terminal means for providing marker position-changing pulses and circuit means connecting said input and output terminal means for passing the received control pulses to the output terminal means when the selected frequency of such received control pulses is below a certain value and for providing a burst of position-changing pulses, for each received pulse, at said output terminal means when the selected frequency of such received pulses is greater than said certain value.

7. A circuit as defined in claim 6 wherein said circuit means comprises a monostable device connected to said input terminal means and having an output whose duration determines said certain value.

8. A circuit as defined in claim 7 wherein said circuit means also includes a binary device connected to said output of the monostable device and having a pair of complementary outputs, first gate means connected to said input terminal means and to one output of said binary device for producing an enabling output when the signal at said one output is of a particular state, second gate means connected to the other output terminal of said bistable device and having a further input which is a continuous train of pulses for producing a train of driving pulses when said other output is of said particular value, third gate means connected to the outputs of the first and second gate means and having said output terminal means as its output, and counter means connected to the output of said second gate means for resetting said binary device in response to a particular number of pulses in the train thereof produced at the output of said second gate means.

* * * * *